July 21, 1970 T. W. CARLSON 3,521,390
SIGNBOARD WIND LOAD LIMITING APPARATUS
Filed Dec. 7, 1967 2 Sheets-Sheet 1
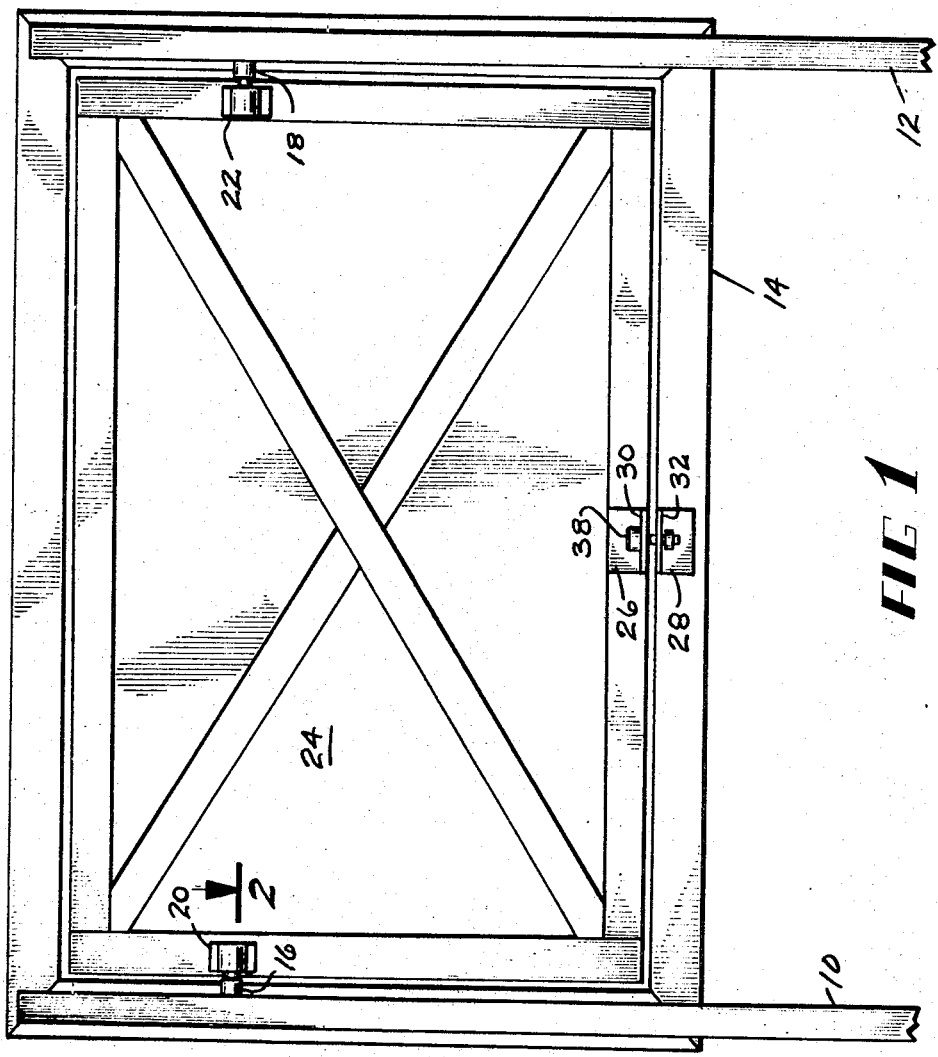
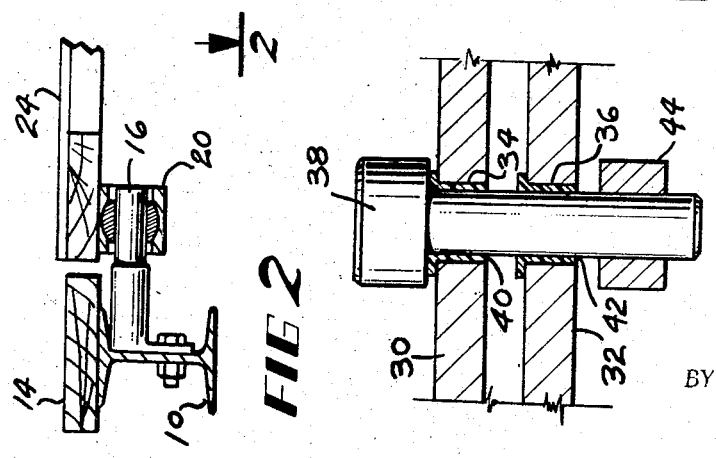
INVENTOR.
THOMAS W. CARLSON
BY
ATTORNEY July 21, 1970     T. W. CARLSON     3,521,390

SIGNBOARD WIND LOAD LIMITING APPARATUS

Filed Dec. 7, 1967     2 Sheets-Sheet 2

INVENTOR.
THOMAS W. CARLSON

BY

ATTORNEY

United States Patent Office 3,521,390
Patented July 21, 1970

3,521,390
SIGNBOARD WIND LOAD LIMITING APPARATUS
Thomas W. Carlson, 228 Pearl St.,
New Brighton, Minn. 55112
Filed Dec. 7, 1967, Ser. No. 688,784
Int. Cl. G09f 7/22
U.S. Cl. 40—125                                   4 Claims

ABSTRACT OF THE DISCLOSURE

Apparatus for protecting signboards from wind damage and allowing the use of smaller supporting columns consisting of a signboard framework having a pivot upon which one or more signboard panels is mounted for movement on an axis located closer to one side of the panel than the other and a releasable load limiting lock connected between the panel and the framework for normally holding the panel in a fixed position and for releasing the signboard when the wind loading exceeds a predetermined value. The load limiting lock can consist of a pin formed from a material adapted to fracture at a predetermined loading or of a pin positioned to mate with an element held by a spring against movement to a pin releasing position until a predetermined loading is exceeded. By changing the spring tension the maximum wind loading of the sign can be changed.

---

The present invention relates to signboards and more particularly to an improved apparatus for normally maintaining a signboard panel in a fixed position but for releasing the panel when a predetermined force is exerted against the panel by the wind.

Apparatus previously proposed for protecting signs from wind damage exemplified by U.S. Pat. Nos. 1,823,404 and 2,084,818 has not been entirely satisfactory. In the case of the former patent, panels are normally retained in their undeflected position by a suspended weight and consequently wind forces very substantially below the maximum wind loading for which the sign is designed will produce some deflection of the pivotally mounted panels. In the case of the second patent, panels are secured in place by the provision of both leaf springs and a spring loaded detent member. The apparatus is complicated in construction, subject to malfunction at times when ice or snow is deposited on the springs and detent elements employed for holding the panels in place are not well suited for accurate loading control. Consequently, the wind force at which the signboard element will be released cannot be precisely controlled.

In view of these and other defects of the prior art it is one object of the present invention to provide an improved signboard wind load limiting apparatus having the following characteristics and advantages: (a) the ability to reliably release a signboard element from a rigid position to a pivotally mounted position when the wind loading against the signboard element exceeds a precisely predetermined maximum load limit; (b) a provision for preventing damage to the load limiting lock either by vibration or weather conditions prior to its being released; (c) the provision of an improved load limiting lock of the type described which is adapted to be employed in a variety of signs of different sizes; (d) a prevision for adjusting the load limit of the lock at which the lock is released; (e) a provision for enabling the locking unit to release the sign panel at a precisely controlled wind loading; (f) a provision for enabling the wind load limiting lock to reset itself automatically after the sign panel is returned from its deflected position to its original position.

These and other more detailed and specific objects will be apparent in view of the following specification and the accompanying drawings wherein:

FIG. 1 is a rear elevational view of a signboard embodying the invention.

FIG. 2 is a partial horizontal sectional view taken on line 2—2 of FIG. 1 on a somewhat enlarged scale.

FIG. 3 is a partial vertical sectional view of the load limiting lock of FIG. 1 on a greatly enlarged scale.

Figure 4:
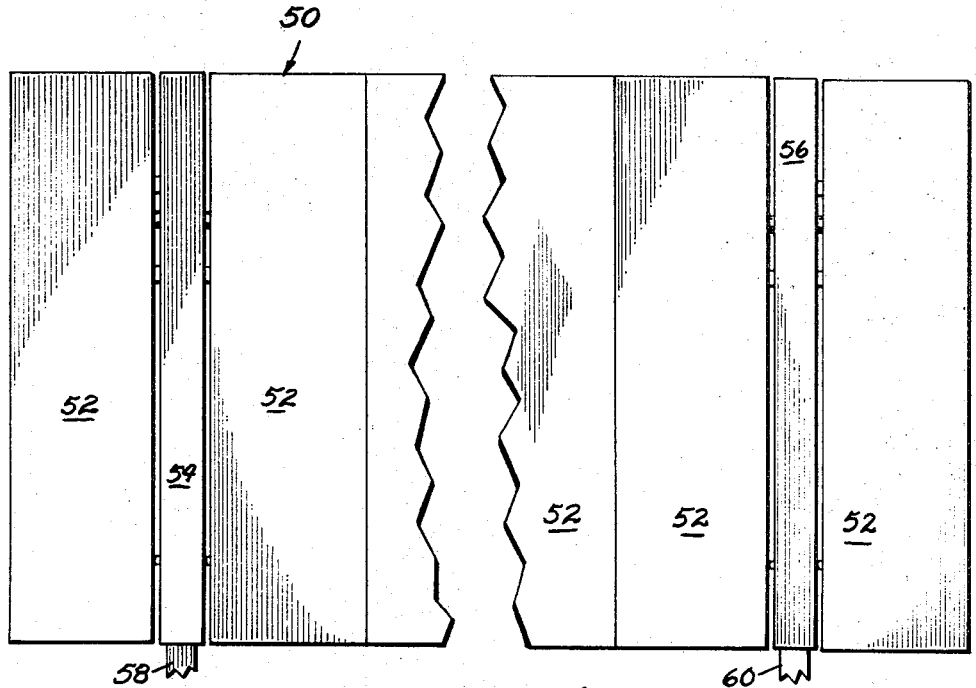
FIG. 4 is a front elevational view of a signboard embodying another form of the invention.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will now be described particularly in connection with outdoor advertising signs by reference to FIGS. 1–3. It is, of course, well known that damage to outdoor advertising signs as a result of high winds has been a longstanding problem. In addition to the adverse publicity received, the cost of replacing the signs and the associated inconvenience is a source of irritation to manufacturers and users alike. Personal property and injury claims caused by falling signs is an additional liability that must be contended with by the outdoor advertising companies.

As seen in FIGS. 1–3, the signboard consists of a framework including a pair of supporting columns 10 and 12 to which is rigidly secured a rectangular frame 14. A pair of horizontally disposed supporting shafts 16 and 18 are rigidly secured to the columns 10 and 12 respectively and are journalled within self-aligning bushings 20 and 22. The shafts 16 and 18 in this instance are formed from malleable cast yellow brass and have a diameter of about 1 inch. Because the bushings are self-aligning, thermal expansion and settling is compensated for.

Secured to the bushings 20 and 22 is a signboard element or panel 24. It should be noted that the pivots defined by the shafts 16 and 18 are positioned closer to the top of the panel 24 than the bottom. This will enable the sign panel 24 to swing freely when the predetermined wind loading has been exceeded.

Secured in vertical alignment to the lower portion of the panel 24 and the center of the lower portion of the frame 14 are a pair of lock supporting members such as angle iron sections 26 and 28 having horizontally disposed aligned plates 30 and 32 respectively. The plates 30 and 32 are bored at 34 and 36 respectively to receive a loading pin 38. Between the pin 38 and the openings are provided bushings of a suitable cushioning material such as a thermoplastic resin. The thermoplastic resinous bushings are designated 40 and 42. A sleeve 44 is press-fitted over the lower end of the pin 38 to retain it in position.

The loading pin 38 should be formed from a relatively brittle material and must have a precisely controlled diameter so that it will fracture at an exactly predetermined loading. In a typical application, the pin 38 will have a diameter of about ¼ inch but this, of course, will depend upon its composition. Cast brass is a suitable material for this purpose. Because the composition and dimensions of the pin 38 are precisely controlled and because the sleeves 40 and 42 are effective in preventing the pin from being damaged by the normal buffeting of the wind below the preset loading, the pin 38 will reliably fracture at a precisely controlled wind loading. It should be noted that the bushings 40 and 42 function to uniformly distribute the restraining force of the plates 30 and 32 on the surface of the pin as well as protecting the pin from damage due to normal shock and vibration.

Under normal wind conditions, the sign panel 24 remains fixed. In the event, however, of a gale force wind (typically a wind velocity of 60 m.p.h.), the loading pin 38 will fracture at the preset load and the wind will deflect the signboard panel 24 to about the pins 16 and 18. A safety line (not shown) can be secured, if desired, between the lower edge of the panel 24 and the frame 14 to prevent excessive deflection of the panel from its normal position.

In accordance with a preferred form of my invention, the strength of the columns 10 and 12 or other supporting means is matched to the strength of the pins with the columns having just sufficient strength to prevent fracture or other damage to the columns at wind loadings below the wind loading for which the pin 38 is set to fracture.

Another form of the invention will now be described for use in connection with highway marker signs in which no surrounding border or frame is normally desired.

Figure 5:
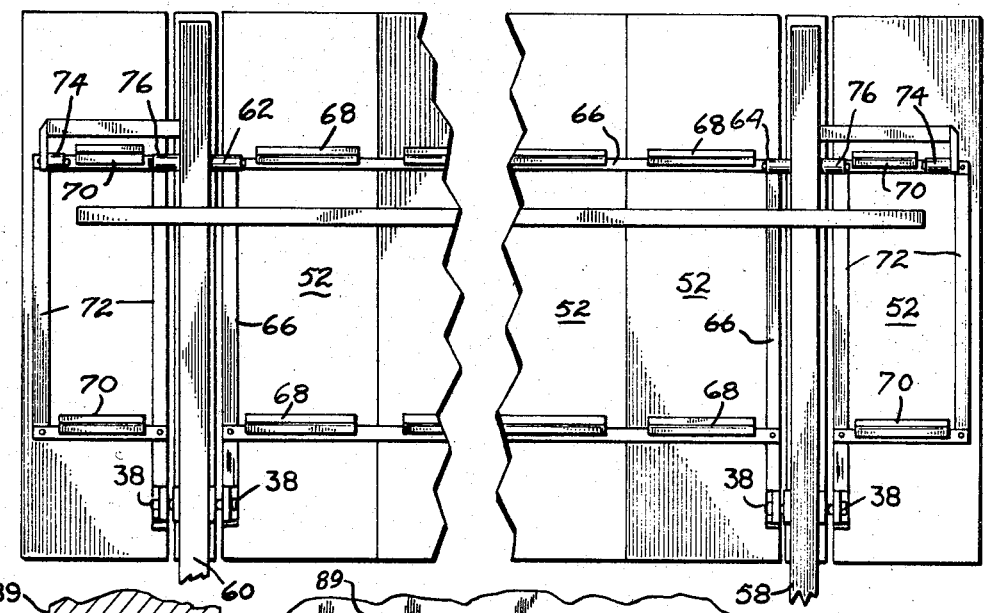
FIG. 5 is a rear elevational view of the signboard of FIG. 4.

As seen in the figures, a signboard 50 is composed of a plurality of panels 52 of approximately equal size positioned vertically and alignment with each other. A pair of very narrow panels 54 and 56 are rigidly secured to vertically disposed supporting columns 58 and 60. As seen in FIG. 5, aligned pivots 62 and 64 are secured to the supporting columns 58 and 60 respectively. Fastened to the pivots is a rectangular panel supporting bracket 66. The panels 52 are provided with vertically spaced hooks 68 that allow them to be quickly and easily removed and replaced as needed on bracket 66.

The outermost panels 52 are similarly secured by vertically spaced hooks 70 to rectangular brackets 72 which are themselves in turn supported from aligned pivots 74 and 76, the same parts on opposite sides of the sign being designated by the same numbers.

Suitably secured between the supporting framework members 58 and 60 and the sign panels are load releasing locks 80 the same as those in FIGS. 1 and 3, each including a pin adapted to fracture at a predetermined loading. Since the pins and their construction have been adequately described above, no further description is needed except to say that the pins are positioned on a horizontal axis in this instance. Because of the much smaller size of the outer most panels 52, their pins will be much smaller than those used for the center panels of the sign.

A method employed for calculating the dimensions of the loading pin 38 or 80 will now be described.

$$M = A_2 \times X \times q - A_1 \times X \times q$$

where M=sum of moments around pivot (foot-pounds), A=area of panel (feet$^2$), X=length of center of area from axis of rotation (feet) and $q$=wind pressure (9.2 pounds/foot$^2$ at 60 m.p.h.) then $$M = 300 \times 9.2 - 150 \times 2.5 \times 9.2$$
$$M = 10,125 \text{ foot-pounds}$$
$$P \times X = M \times C_n$$

P=load on pin (pounds), X=pin distance from axis of rotation (feet), $C_n$=shape factor of billboard (1.2) then $$P \times 10 = 10,125 \times 1.2$$

and $$P = 1200 \text{ pounds}$$

Since $s = P/A = 4P/\pi D^2$ where $s$=shear stress of pin. Cast yellow brass, shear stress=20,000 p.s.i. and A=area of pin $D^2/4$, P=load on pin (pounds) then $$20,000 = 4.1200/D^2$$

or $$D = .26 \text{ inch}$$

A very substantial saving in the cost of materials can be effected through the use of the invention since it is unnecessary to design supports to withstand loadings that result from a wind velocity of over 60 or 70 m.p.h. Along highways an important benefit of the invention is the greatly reduced collision hazard that results from the smaller sign supports that can be used. Thus, in a typical application of the invention, a sign having an area of 200 square feet will cost about $105.00 less than when provided with a maximum wind loading of 60 m.p.h. compared with a maximum wind loading of 100 m.p.h. for a conventional sign. If the area of the sign is 600 square feet, the saving will be about $175.00 per sign and if the area of the sign is 800 square feet, the saving will be about $255.00 per sign. These calculations are made assuming an installed steel cost of $.25 per pound.

Figures 6, 7:
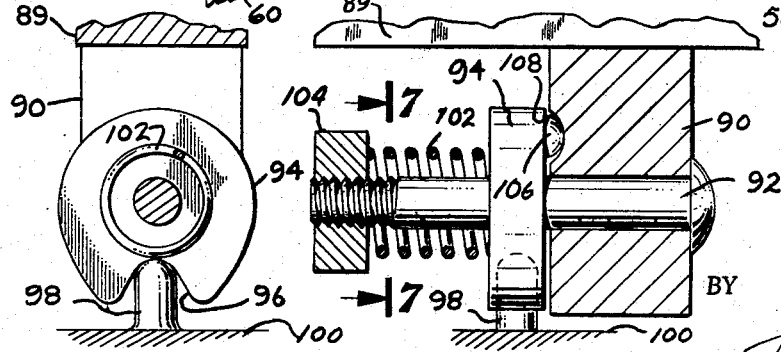
FIG. 6 is a vertical sectional view of another form of releasable load limiting lock in accordance with the invention.
FIG. 7 is a transverse sectional view taken in line 7—7 of FIG. 6.

Refer now to FIGS. 6 and 7 which illustrate a modified form of a load limiting lock in accordance with the invention. As seen in the figures, the bottom portion of the signboard or sign panel 89, i.e. the part of the sign adapted to swing outwardly when the maximum loading is exceeded is designated 90. Secured to the bracket 90 is a bolt 92 which functions as a pivot for generally cylindrical locking element 94 having a recess 96 at its lower edge adapted to receive a pin 98 that is affixed rigidly to the framework 100 of the sign. A spring 102 retained between the cylinder 94 and a nut 104 forces a projection 106 into a cup shaped recess 108 thereby retaining the cylinder 94 against rotation on pin 92. When the preset wind loading is exceeded, the torque exerted by the pin 98 on the cylinder 94 about pin 92 will unseat the projection 106 thereby allowing the cylinder 94 to rotate on pin 92 and when the panel 89 and its bracket 90 returns from its deflected position, the cylinder 94 (which is retained in the position taken immediately after the pin 98 become disengaged owing to the friction of the projection 106 against the surface of the bracket 90 and the projection 106) will automatically re-engage pin 98 and projection 106 will return to the recess 108. The sign panel 89 and bracket 90 will again be locked in its undeflected position as shown in the figures. If the preset wind loading is to be increased, nut 104 should be turned in the proper direction and degree to compress the spring 102 the desired amount and in this way the releasing force for the lock can be properly adjusted (e.g. by placing a torque wrench on cylinder 94) for the frontage area of the particular sign under construction.

The invention is particularly useful with shear-off sign supporting columns having an easily sheared coupling about two feet above the ground and presently being used in the Federal highway program.

It is apparent that many modifications and variations of this invention as hereinbefore set forth may be made without departing from the spirit and scope thereof. The specific embodiments described are given by way of example only and the invention is limited only by the terms of the appended claims. The term "signboard" or "sign" as used herein is intended to include similar structures such as drive-in theater screens and airplane hangar walls, etc.

I claim:

1. A wind load panel releasing apparatus for signboards and the like comprising a supporting framework, a sign panel connected to the framework, a supporting means between the panel and the framework for allowing the panel to be articulated between an undeflected position and a deflected position whereby the signboard can be at least partially aligned with the flow of air past the sign and a releasable load limiting lock connected between the signboard and framework and the panel for normally holding the sign panel in a fixed position and for releasing tthe sign panel from the undeflected position when the wind loading on the sign panel exceeds a predetermined maximum value and a means on the releasable load limiting lock for controlling the magnitude of the force applied to the panel that is necessary to release the lock including a pin provided upon the signboard panel, a cylindrical element mounted for rotation on the pin, a projection on the cylindrical element extending along an axis parallel to the pin and said projection being normally engaged within a recess on the panel, a spring operatively associated with the cylinder for forcing the projection into the recess, a fixed element for retaining the spring under compression and a second pin affixed to the framework and operatively engaged with the periphery of the cylinder whereby the size and strength of the supporting framework can be held below precisely determined values.

2. The apparatus of claim 1 wherein the strength of the supporting framework is matched to the magnitude of the force required to unlock the releasable load limiting lock such that the supporting framework has just sufficient strength to prevent fracture or other damage to the supporting framework at wind loadings below the wind loading for which the load limiting lock is set to be disengaged by the force of the wind against a panel.

3. The apparatus according to claim 1 wherein the fixed element for maintaining the spring under compression is mounted for selected movement between spring compressing and spring releasing positions whereby the force exerted by the spring against the cylinder can be varied to thereby change the load limit at which the lock will release.

4. The apparatus of claim 1 wherein parallel supporting plates are provided, one such supporting plate being mounted upon the panel, the other being mounted upon the supporting framework, said plates having aligned openings bored therethrough and said pin extending through said openings, and an elastic bushing between the pin and the adjacent surface of each opening to prevent damage to the pin due to shock subjected thereto at a force less than the predetermined shear force required to fracture the pin.

References Cited

UNITED STATES PATENTS

| 965,111 | 7/1910 | Kemper | 52—98 X |
| 1,449,063 | 3/1923 | Shotwell | 40—138 |
| 1,854,215 | 4/1932 | Mueller. | |
| 3,120,069 | 2/1964 | Pfaff et al. | |

EUGENE R. CAPOZIO, Primary Examiner

R. CARTER, Assistant Examiner

U.S. Cl. X.R.

52—98